Figure 1:
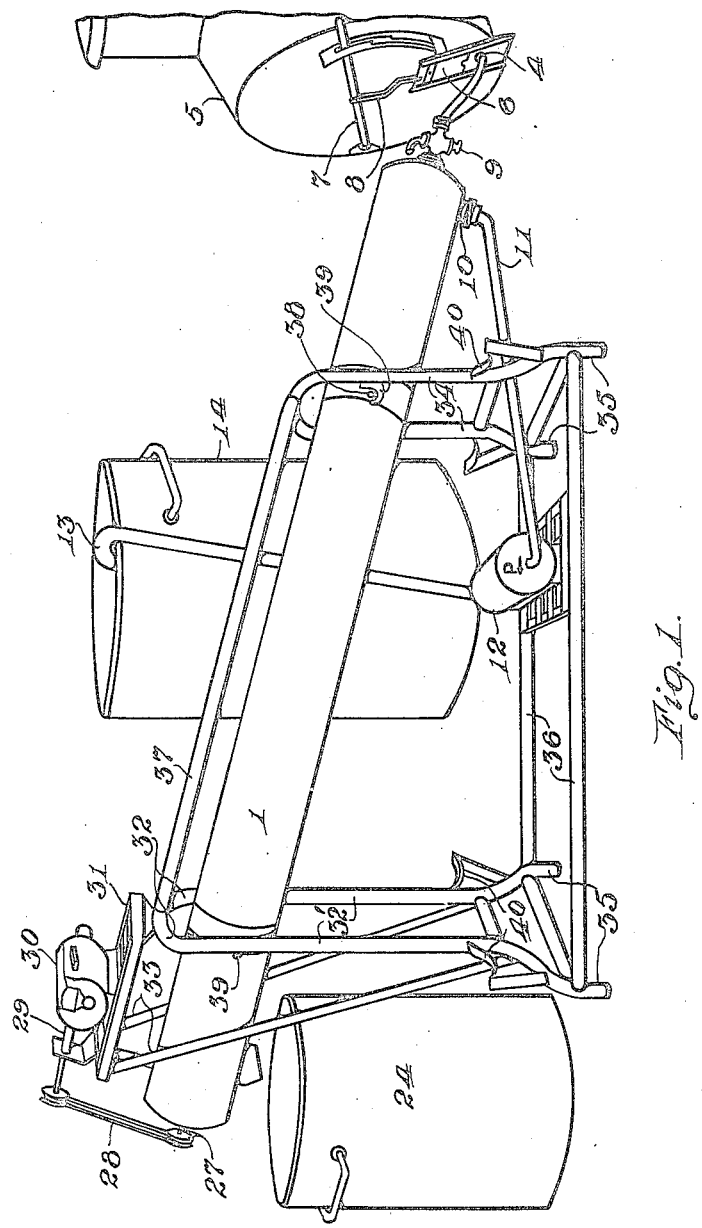

Feb. 7, 1950   J. B. ORRELL   2,496,636
FRUIT STRAINER

Filed Jan. 5, 1946   3 Sheets-Sheet 1

Inventor,
Joseph B. Orrell,
by
J. Stuart Freeman,
Attorney.

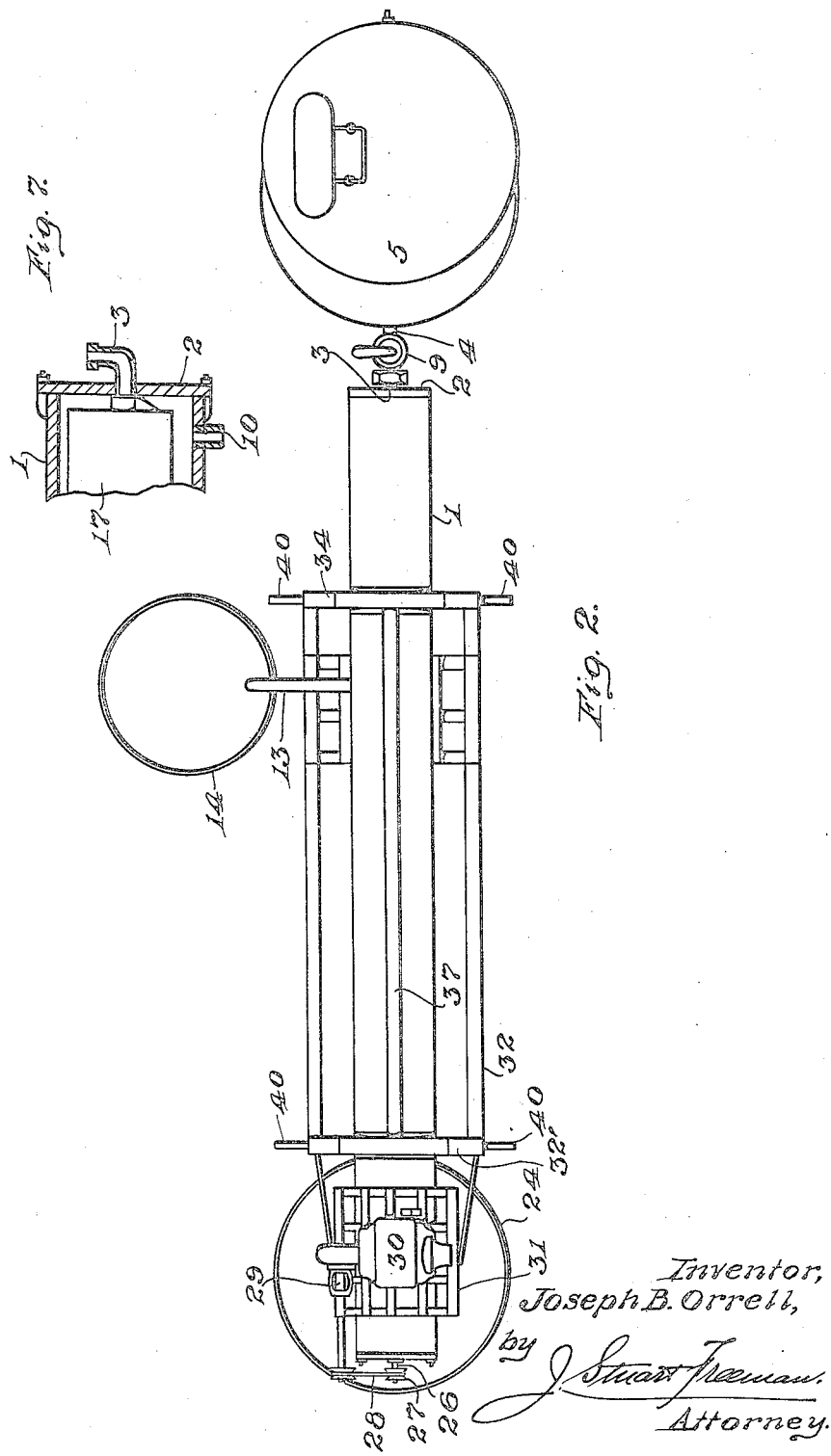

Feb. 7, 1950 J. B. ORRELL 2,496,636
FRUIT STRAINER
Filed Jan. 5, 1946 3 Sheets-Sheet 3
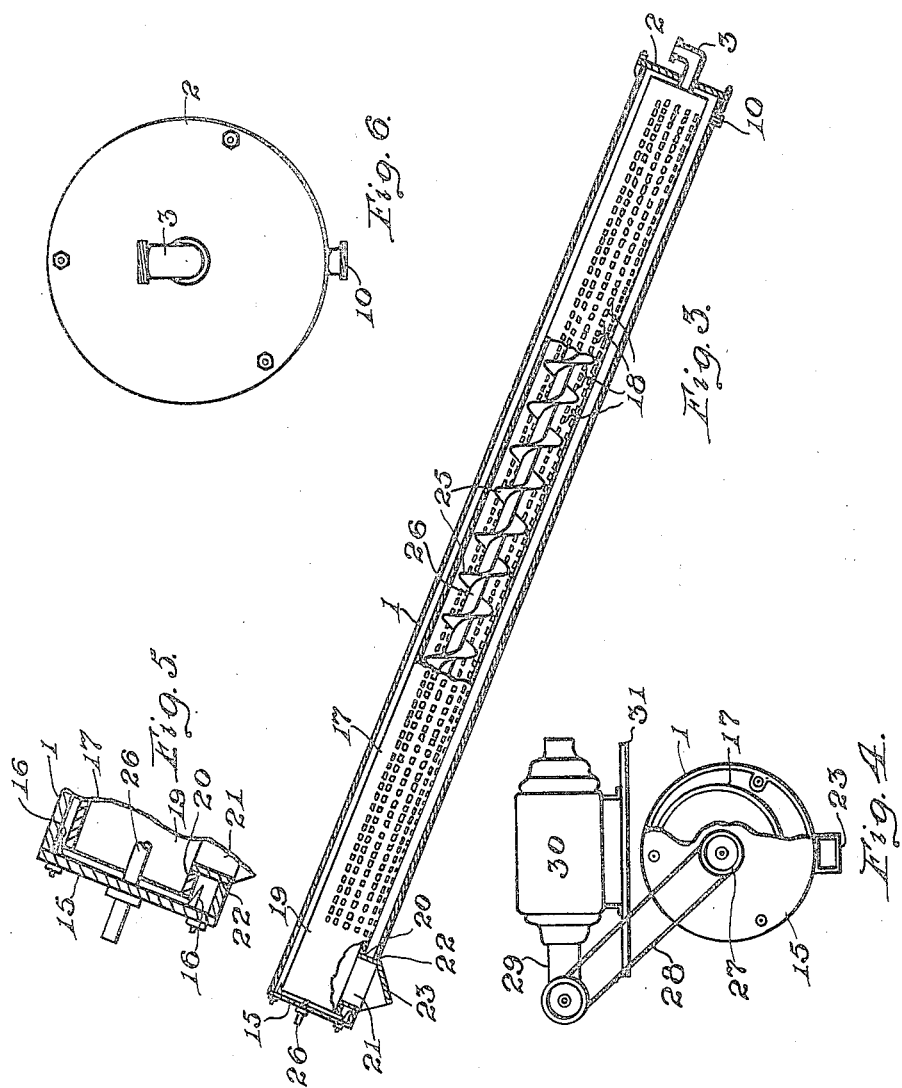
Inventor.
Joseph B. Orrell,
by J. Stuart Freeman,
Attorney.

Patented Feb. 7, 1950

2,496,636

UNITED STATES PATENT OFFICE 2,496,636

FRUIT STRAINER

Joseph B. Orrell, Drexel Hill, Pa., assignor to Abbotts Dairies, Incorporated, Philadelphia, Pa.

Application January 5, 1946, Serial No. 639,248

6 Claims. (Cl. 210—194)

The object of the invention is to provide an improved and more sanitary method of preparing frozen or cold packed berries and fruits for use in ice cream, sherbets and ices, together with apparatus for carrying out said method commercially.

In order to illustrate the need for and use of the improved device, reference is made to the preparation of strawberries for use as an ingredient in ice cream of that well known flavor. Fruit and berries are usually packed with a sugar content of 3 to 1, or 4 to 1, and then frozen so they can be used in flavoring ice cream during the time of year when fresh berries or fruits are too expensive or are not available. They cannot be used in the manufacture of ice cream until the sugar content has been increased to 2 to 1; otherwise, the strawberries, after being frozen in the ice cream, would be too hard to eat. In fact, it would be like biting upon a stone or pebble. The 3 to 1, or 4 to 1, berries are placed in a suitable container, at which time additional sugar is added and stirred through the juice and berries by a stainless steel agitator, which is in the tank until the sugar is entirely dissolved. After the sugar is completely dissolved, said tank is connected to the strainer and the berries are separated from the juice, the juice then being added to the ice cream mix, while the berries are injected into the ice cream after it has passed through the ice cream freezer, prior to its being filled into cans and placed in the usual hardening room. The purpose of adding the berries after their going through the freezer is to have recognizably large pieces of strawberries showing in the finished product.

Another object, therefore, is to provide an improved strainer, that can be operated at highest efficiency, that can be washed and sterilized with utmost ease, and that in general offers a much improved structure over those heretofore available.

With the objects thus briefly referred to, the invention comprises details of construction and operation, which are hereinafter fully brought out in the following description, when read in conjunction with the accompanying drawings, in which Fig. 1 is a perspective view of a device comprising one embodiment of the invention, as seen from one side; Fig. 2 is a plan view of the same. Fig. 3 is a vertical, longitudinal section through the outer cylindrical casing and the internal cylindrical strainer element; shown partly in elevation and partly in section; Fig. 4 is an enlarged end elevation of the same with the driving motor superimposed above it in schematic arrangement; Fig. 5 is an enlarged sectional view of a fragmentary portion of the discharge end of the device; Fig. 6 is an end elevation of the opposite end of said device; and Fig. 7 is an enlarged sectioned view, showing the rotatable mounting of the lower end of the strainer element.

Referring to the drawings, one embodiment of the invention comprises an outer tubular cylinder 1, normally arranged for operation in an inclined position (Figs. 1 and 3), and having its lower end closed by a plate 2 through which extends one end of an intake elbow 3, which is designed for connection to the outlet 4 of a fruit mixing tank 5, said tank outlet being controlled by a slide valve 6, operated by a lever 7 and link connection 8. An additional valve 9 is preferably interposed between the tank outlet 4 and the intake elbow 3.

The lower end of said cylinder 1 is also provided with a laterally positioned drain or discharge port 10, that is connected through a pipe 11, to a suitable pump 12 and pipe 13 that discharges into the upper portion of a collecting tank 14, which in the present instance is used to receive and store juices from the fruit processed by the strainer mechanism as a whole. Said mixing tank, pump and juice-receiving tank do not enter into the invention, except as a part of a unified system, such as fits admirably into the manufacture of fruit-flavored ice cream, and are therefore shown diagrammatically.

The upper end of said outer cylinder 1 is closed by a removable plate 15, that is provided upon its inner surface with a plurality of circumferentially spaced tapering studs 16, having inwardly converging surfaces that serve as centralizing supports for the upper end of an inner cylindrical strainer element 17, that throughout approximately two-thirds or three-quarters of its circumference is provided with circumferentially spaced rows of perforations 18, which are preferably elongated longitudinally of said element, but which may be circular, elliptical, or any other desired shape.

Said perforations terminate short of the upper end of said element in an imperforate portion 19, which is provided with a downwardly directed outlet 20, from which a hollow channel member 21 bridges the distance between said element and an aligned opening 22 in the outer cylinder 1, beyond and beneath which latter said channel member terminates in a deflecting portion 23, which directs fruit freed from the major portion of its juices towards a collecting receptacle 24.

Whereas the strainer element is fixedly supported within said outer casing, within said element is rotatably mounted an Archimedian screw conveyor 25, having a shaft 26 that extends freely beyond the upper casing closure plate 15 and is provided with a pulley 27, connected by a belt (or sprocket) 28 to a pulley forming part of a suitable reducing gear unit 29, driven by a motor 30 which is carried by a platform 31 upon the upper portion 32, of a framework that is partially supported by diagonal brackets 33.

Preferably the axis of said strainer element and said screw are above the axis of said casing, so as to provide a greater space between their lower portions for the free passage of the juices.

Said framework comprises the rear pair of upwardly extending uprights 32', a forward pair of shorter uprights 34, ground-engaging feet 35, lower horizontal spacing rods 36, and an upper spacing rod 37 that substantially parallels the strainer unit.

Within said framework, said strainer unit is removably supported by means of oppositely extending lugs 38, normally resting in brackets 39 carried by the uprights 32' and 34. In addition, said uprights upon their opposite outer sides may be provided with additional brackets or stirrups 40, upon which said outer casing and said strainer element are supported after being cleaned and left disassembled for drying. Obviously, the shape, size and exact location of these minor portions of the device, and the shape and detailed construction of said framework are not essential to the functioning of the principles of the strainer per se and its general operation.

When in operation, fruit with its natural juices, added sugar and possibly other ingredients are mixed within the mixing tank 5, whence they are permitted to flow into the lower end of said casing and strainer element. The screw conveyor 25 is rotated by the motor 30, and as the relatively solid portions of the fruit are gradually elevated towards the upper end of said strainer and its casing, the liquid juices pass through the strainer apertures into the casing, whereupon they gravitate towards the lowermost portion thereof, in the larger space between the lower portions of the sides of said element and said casing, and are withdrawn by the pump 12 and elevated towards and into the juice-receiving tank 14, the fruit itself falling from the strainer into the receptacle 24.

Summarizing the principal purposes for which this machine is designed, but without limiting its use to the exact performance set forth as illustrative, the fruit or berries (referred to in the claims broadly as fruit) may be fresh, or may have been preserved and held in storage combined with sugar in the preferred proportion of approximately three-to-one or four-to-one parts of the fruit to that of sugar. In either case, sufficient sugar is added to bring the proportion up to approximately two-to-one, in which condition the fruit is separated from the major part of the juice, the juice added to the ice cream mix for flavor and natural coloring, the said mix "frozen" as the term is understood in the trade, that is, to a semi-solid consistency, following which the relatively whole pieces of fruit (or substantially whole berries) are injected into and dispersed throughout the semi-solid mass, which latter is then placed in the hardening room (at about −20° F.) for indefinite storage, shipment and general preservation.

Having thus described my invention, what I claim and desire to protect by Letters Patent of the United States is:

1. A strainer, comprising a tubular casing having an inclined axis, a perforated tubular element within and of less diameter than said casing and its axis being parallel with but spaced from and above the axis of said casing, a discharge duct leading radially from within said element, through the intervening space and from said casing, means to lead solids and liquids into the lower end portion of said element, a screw within said element operative to elevate the solids therein while the liquids flow from said element through its perforations and gravitate longitudinally through said casing towards a liquid discharge outlet therein, and means to rotate said screw.

2. A strainer, comprising a tubular casing having an inclined axis, a perforated tubular element within and of less diameter than said casing and its axis being parallel with but spaced from and above the axis of said casing, a discharge duct leading radially from within said element, through the intervening space and from said casing, means to lead solids and liquids into the lower end portion of said element, a screw conveyor within said element operative to elevate the solids therein while the liquids flow from said element through its perforations and gravitate longitudinally through said casing towards a liquid discharge outlet therein and means to rotate said screw conveyor, said element being eccentrically positioned with respect to said casing, so that a larger space extends between the lower portions of said element and said casing, than between their upper portions.

3. A strainer, comprising a frame, a tubular casing supported thereby in an inclined position, a perforated tubular element within and of substantially less diameter than said casing, their axes being eccentric but parallel and said casing and element being closer together at their upper sides, means to lead combined solids and liquids into the lower end of said element, a discharge duct leading radially from the upper portion of said element, through the intervening space and through the adjacent portion of said casing, a liquid discharge opening in the lower portion of said casing, a screw conveyor within said element, means to rotate said conveyor to elevate the solids towards said discharge duct, while liquids pass through the perforations of said element into said casing and gravitate towards said discharge opening.

4. A strainer, comprising a tubular casing having an open end, a perforated cylindrical tubular element within and spaced from said casing, a closure plate for the end of said casing, and means carried by the inner surface of said plate to position said element eccentrically with respect to said casing, with a greater space beneath than above said element, movable means to propel solids through said strainer, an axial inlet at one end to permit entrance of solids and liquids into said element, a solids discharge outlet extending radially from within said element, through the intervening space and through a side of casing, and a liquid outlet from said casing.

5. A strainer, comprising a tubular casing, a closure plate for one end thereof provided with inwardly extending studs having adjacent surfaces that converge as they approach the inner surface of said plate, said studs being circumferentially spaced in a circular pattern, the center of said pattern being eccentric of said plate, a stationary strainer element positioned and supported at one end by and between said studs closer to the upper than to the lower side of said casing, an axial inlet at one end to admit combined solids and liquids into said element, a solids discharge outlet extending radially from within said element through the intervening space and through a side of said casing, and a liquid outlet from said casing.

6. A strainer, comprising a tubular casing, a closure plate for one end thereof provided with inwardly extending studs having angularly related surfaces, said studs being circumferentially spaced in a circular pattern and as a group being eccentrically positioned with respect to said plate and said casing, a stationary strainer element positioned and supported by said studs closer to the upper than to the lower side of said casing, movable means to propel solids through said strainer element, an axial inlet at one end to admit combined solids and liquids into said element, a solids discharge outlet extending radially from within said element through the intervening space and through a side of said casing, and a liquid outlet from said casing.

JOSEPH B. ORRELL.

REFERENCES CITED

The following references are of record in the file of this patent:

UNITED STATES PATENTS

| Number | Name | Date |
| --- | --- | --- |
| 1,024,230 | Turner et al. | Apr. 23, 1912 |
| 1,649,634 | Lomax | Nov. 22, 1927 |
| 1,772,262 | Naugle | Aug. 5, 1930 |
| 1,845,893 | Sommermeyer | Feb. 16, 1932 |
| 2,398,830 | Hamilton | Apr. 23, 1946 |

FOREIGN PATENTS

| Number | Country | Date |
| --- | --- | --- |
| 290,629 | Germany | Mar. 8, 1916 |